BEFORE SUBJECTING Al STRIPE TO CURRENT

AFTER SUBJECTING Al STRIPE TO CURRENT AT A CURRENT DENSITY OF 2×10⁶ AMPS/CM² AT A STRIPE TEMPERATURE OF 170° C FOR 223 HOURS

INVENTORS
NORMAN AINSLIE
GEORGE CHEROFF
WILLIAM S. GRAFF
J. KENT HOWARD
RUPERT F. ROSS
BY William Kaufman
ATTORNEYS BEFORE SUBJECTING A$\ell$+~3% Cu STRIPE TO CURRENT.

AFTER SUBJECTING A$\ell$+~3% Cu STRIPE TO CURRENT AT A CURRENT DENSITY OF $4\times10^6$ AMPS/CM$^2$ AT A STRIPE TEMPERATURE OF 175°C FOR 1242 HOURS

DOPED ELECTRICAL CURRENT-CARRYING CONDUCTIVE MATERIAL

Filed Jan. 8, 1970 6 Sheets-Sheet 3

United States Patent Office 3,695,855

Patented Oct. 3, 1972

3,695,855

DOPED ELECTRICAL CURRENT-CARRYING CONDUCTIVE MATERIAL

Norman G. Ainslie, Poughkeepsie, George Cheroff, Hopewell Junction, William S. Graff, Poughkeepsie, and James Kent Howard, Fishkill, N.Y., and Rupert F. Ross, Boulder, Colo., assignors to International Business Machines Corporation, Armonk, N.Y.

Filed Jan. 8, 1970, Ser. No. 1,502

Int. Cl. H01b *1/02*

U.S. Cl. 29—191.6 10 Claims

ABSTRACT OF THE DISCLOSURE

This invention provides a means of increasing the time-to-failure of doped conductive stripes by depositing regions of dopant rejuvenant upon regions in the stripe wherein dopant depletion is most apt to occur under current stress. This invention also provides a means of rejuvenating regions wherein dopant depletion has occurred by periodically applying heat to a microelectronic configuration containing doped conductive thin films for interconnection purposes, said thin films containing local, discontinuous deposits of dopant rejuvenant over regions within the film wherein temperature gradients or diffusion barriers arise under current stress resulting in mass flux divergences in said regions, i.e., a resultant efflux of dopant from said region. Application of heat in this manner permits diffusion of dopant rejuvenant from the localized dopant rejuvenant source into the region from which dopant has migrated during service, thereby rejuvenating the microelectronic configuration and enabling its continued use.

BACKGROUND OF THE INVENTION

This invention relates generally to improvements in doped conductive stripes and methods of fabrication thereof, and it relates more particularly to improved copper doped aluminum stripes for solid state configurations exhibiting resistance against current-induced mass transport.

It is necessary for practical solid state microelectronic configurations that thin conductive films be used for interconnection purposes. Heretofore, aluminum stripes have been considerably used for such current interconnection purposes. A serious defect of the commonly used aluminum conductive stripe for interconnection purposes in a microelectronic structure has been the propensity for failure after a not too considerable period of time arising from a current-induced mass transport failure mechanism. During such mass transport in aluminum, there is removal of material from one or more locations in the current path and buildup at one or more other locations in the current path.

Under certain circumstances the underlying physical phenomenon which induces the failure is considered to be electromigration. The term "electromigration" is considered in the art to denote the current-induced mass transport which occurs in a conductive material maintained at an elevated temperature and through which current is passed wherein atoms of conductor material are displaced as a result of the combined effects of direct momentum exchange from the moving electrons and the influence of the applied electric field. Generally, failure is defined to mean that the conductive stripe can no longer serve its intended purpose of interconnecting in a current sense component aspects of the solid state or semiconductor device. The current-induced mass transport phenomenon manifests itself as a partial removal of the material under the influence of the electrical current from one or more locations to a buildup of material at one or more other locations. The removal of material can result directly in an open circuit and the buildup of material can manifest itself directly as a short circuit from the current carrying member to another location via an undesired path caused by current-induced mass transport was apparently ability of an overlying protective layer such as an encapsulating insulating layer, if used, can be impaired or fractured as a result of the indicated material removal or build-up. This can cause failure to come about as a result of removal of the protection afforded by that protective layer, e.g., failure due to atmospheric corrosion.

The nature of one of the types of failure which is caused by currentinduced mass transport was apparently first described in the literature by I. A. Blech et al. in an article entitled "The Failure of Thin Aluminum Current-Carrying Strips on Oxidized Silicon," published in Physics of Failure in Electronics, vol. 5, pages 496–505 (1967). The type of failure described in that article is caused by the local diminution of material along the length of current-carrying stripes and is known in the art as "stripe-cracking." General procedures for reducing the current-induced mass transport of material in stripes is presented in copending patent application Ser. No. 613,947, now Pat. No. 3,474,530 entitled "A Heavy Current Conducting Member," filed Feb. 3, 1967 by N. G. Ainslie et al., assigned to the same assignee, and incorporated herein by reference.

It has heretofore been found that the addition of a relatively small amount of copper dopant to an aluminum stripe markedly increases resistance against circuit failure due to damage caused by current-induced mass tranport in the stripe. Generally, the amount of copper dopant employed is less than about 54 percent by weight and preferably, the percentage copper dopant ranges from about 0.1 to about 10 percent by weight. The use of copper dopant in such manner is presented in copending patent application Ser. No. 791,371, entitled "Copper Doped Aluminum Conductive Stripes and Method Therefor," filed Jan. 15, 1969, by I. Ames et al., assigned to the same assignee, and incorporated herein by reference.

It has now been found, however, that copper doped aluminum stripes, while providing a substantial improvement over aluminum stripes, also eventualy give rise to circuit failure due to damage caused by current-induced mass transport in the stripe. It has been found that under current stress copper atoms can migrate at a faster rate in copper aluminum alloys than can aluminum atoms. Hence, if copper atoms migrate out of a given region faster than they can be replaced, due to mass flux divergences resulting from temperature gradients or diffusion barriers, the resulting copper depletion in that region results essentially in a region of pure aluminum. This aluminum region which forms is, of course, subject to the known deficiencies of aluminum current-carrying stripes, namely, rapid migration of aluminum atoms out of such region with resultant circuit failure.

Microelectronic configurations necessarily give rise to regions wherein mass flux divergences will arise under current stress. In these regions, the propensity for copper atoms to migrate out of the region and the rate of such migration are the principal parameters which determine the time-to-failure of an aluminum copper conductor. Once the copper vacates such a region of the conductor, the aluminum is then free to electromigrate at a much more rapid rate, since copper, as described above, retards the rate of aluminum migration.

For the purpose of this invention, the term "microelectronic configuration" is taken to designate either an individual device of solid state nature to which connection is achieved, in part at least, through the use of conductive thin films, or a logic circuit or other configuration which contains active and passive elements of solid state nature and for which interconnection is achieved, in part at least, through the use of conductive thin films. Specific examples of microelectronic configurations are silicon planar diodes and transistors, and silicon monolithic integrated logic circuits. Other examples are: arrays of such circuits; arrays of semiconductor memory circuits, on the same chip or on separate interconnected chips; arrays of optical sensing semiconductor elements; arrays of magnetic thin film memory elements, thin film transistor circuits, hybrid circuits, etc. Other examples for which this invention is also applicable are metallized glass, plastic or ceramic devices for component use; this also includes the use of thin conductive films on substrates for interconnection to planar devices or circuits.

A background text for the technology of semiconductor devices and integrated circuits is "Integrated Circuits, Design Principles and Fabrication," R. W. Warner, Jr. et al., McGraw-Hill Book Co., 1965. A popular treatment of this subject matter is presented in the book "Transistors and Integrated Circuits" by D. C. Latham, J. P. Lippincott Co., 1966. Descriptions of bipolar and MOS silicon integrated circuits and circuit arrays suitable for the practice of this invention are described in the article by D. H. Roberts, "Silicon Device Technology," IEEE Spectrum 5 101 (February 1968). Descriptions of integrated circuits suitable for the practice of this invention, which utilize glass encapsulation and solder-terminals, are presented in the article by J. Perri et al., "New Dimensions in IC's Through Films of Glass," Electronics, page 108, Oct. 3, 1968. Descriptions of other types of microelectronic configurations in which thin films are used, in part at least, for achieving conductive electrical connection between elements of the configurations may be found in various issues of the IEEE Journal of Solid State Circuits.

Background references on current-induced mass transport phenomena in aluminum conductors are:

(a) "Current-Induced Mass Transport in Aluminum," R. V. Penny, J. Phys. Chem. Solids, vol. 25, page 335 (1964).

(b) "The Failure of Thin Aluminum Current-Carrying Strips on Oxidized Silicon," I. A. Blech et al. Physics of Failure in Electronics, vol. 5, page 496 (1967).

(c) "Direct-Transmission Electron Microwave Observations of Electrotransport in Aluminum Thin Films," I. A. Blech et al., Applied Physics Letters, vol. 11, page 15, (October 1967).

A background reference for statistical analysis of failure rate data is the article "Failure Rate Study for the Lognormal Lifetime Mode," L. R. Goldthwaite, Bell Telephone System Monograph, 3314.

OBJECTS OF THE INVENTION

It is an object of this invention to provide a current conductive thin film stripe which is resistant against circuit failure arising as a consequence of current-induced mass transport phenomena in the film.

It is another object of this invention to provide a solid state configuration with a current conductive thin film interconnection of aluminum copper alloy which exhibits sustained resistance against damage due to current-induced mass transport in the film by including on the film discrete regions of copper capable of rejuvenating copper depletion in regions wherein mass flux divergences are capable of arising under current stress.

It is a further object of this invention to provide a microelectronic configuration or device with a current conductive thin film interconnection which is highly resistant against circuit failure arising as a consequence of curent-induced mass transport phenomena in the film.

It is another object of this invention to provide an electrical interconnection in thin film form of an aluminum copper alloy for a microelectronic configuration which exhibits sustained resistance against damage due to current-induced mass transport phenomena and is capable of periodic rejuvenation by depositing regions of copper rejuvenant upon regions within the thin film wherein mass flux divergences cause depletion of dopant under current stress.

It is another object of this invention to provide a heat treatment method for a copper-doped aluminum conductive stripe for a microelectronic configuration which beneficially distributes copper rejuvenant within the stripe in regions wherein the copper has been depleted.

SUMMARY OF THE INVENTION

This invention provides a means of increasing the time-to-failure of doped conductive stripes by depositing regions of dopant rejuvenant upon regions in the stripe wherein dopant depletion is most apt to occur. This invention also provides a means of rejuvenating regions wherein dopant depletion has occurred by periodically applying heat to a microelectronic configuration containing doped conductive thin films for interconnection purposes, said thin films containing local, discontinuous deposits of dopant rejuvenant over regions within the films wherein temperature gradients or diffusion barriers arise under current stress resulting in mass flux divergences in said regions, i.e., a resultant efflux of dopant from said regions. Application of heat in this manner permits diffusion of dopant rejuvenant from the localized dopant rejuvenant source into the region from which dopant has migrated during service, thereby rejuvenating the microelectronic configuration and enabling its continued use.

Mass flux divergence due to current-induced mass transport can arise in a number of different regions within any microelectronic configuration. Mass flux divergences primarily arise in regions characterized by the existence of thermal gradients or diffusion barriers therein.

Thermal gradients generally arise in regions wherein current density gradients exist. Any region within the microelectronic configuration wherein the cross section of the conductor changes, resulting in a current density change, will give rise to a thermal gradient. Illustrative of regions wherein thermal gradients can be expected to arise under current stress are regions such as stripe-to-stripe contacts, steps in underlying layers of a microelectronic configuration, regions of stripe width change and other similar regions wherein the cross section of the conductor is altered.

Diffusion barriers, however, generally arise in regions wherein electrons pass from a material essentially devoid of a copper supply (or from within which the potential copper supply cannot be tapped), into a copper doped aluminum stripe. In such regions, copper atoms are subject to electromigration out of the region with no potential source of copper replenishment in said region, mass transport of aluminum occurs at an enhanced rate resulting in diminution of material at or in the vicinity of the region ultimately giving rise to electrical failure in the form of an open circuit and concomitantly causing build-up of material in adjacent regions giving rise to potential short circuits and/or rupture of protective insulation. Illustrative of regions wherein diffusion barriers can be expected to arise under current stress are regions such as negative terminal land contacts, metal-to-silicon contacts such as base and collector contacts in npn structures, emitter contacts in pnp structures, drain contacts in field effect transistors, positive diffused resistor contacts and the like.

Thus, in accordance with the present invention an improved long life stripe is provided comprising a layer of conductive material provided with a dopant, said layer containing thereon discrete regions of a dopant rejuvenant, said discrete regions dominating regions within the conductive layer wherein mass flux divergences cause depletion of dopant under current stress, said dopant rejuvenant being adapted to replenish the depleted dopant.

Further, it is considered advantageous to periodically subject the resultant microelectronic configuration to heat treatment in the range of from about 50° C. to about 550° C. to periodically effect beneficial replenishment of depleted dopant in the conductive stripes. Preferably, the heat treatment is conducted for a period of time sufficient to permit the dopant rejuvenant to diffuse into those regions of the stripe wherein mass flux divergence has occurred thereby enhancing and restoring the resistance of the stripe to current-induced mass transport of the base metal.

The improved conductive stripes of the present invention can be conveniently fabricated by conventional masking and metallization techniques. For example, once the microelectronic configuration is obtained using known techniques, the regions wherein mass flux divergence are expected to occur can be exposed using conventional photomasking techniques. Copper can be deposited upon such exposed regions employing an electron bombardment evaporation source whereby copper is ejected from a copper hearth. Alternatively, the copper can be deposited by means of radio-frequency sputtering using a copper cathode. The copper rejuvenant so introduced onto the aluminum copper stripe provides a potential reservoir to compensate for copper depletion in the stripe during service thereby enhancing the lifetime against failure due to current-induced mass transport. The use of an appropriate heat treatment further enhances the lifetime of the stripe.

The foregoing and other objects, features and advantages of the invention will be apparent from the following more particular description of preferred embodiments of the invention as illustrated in the accompanying drawings.

DESCRIPTION OF THE INVENTION

Figures 1, 3, 3A:
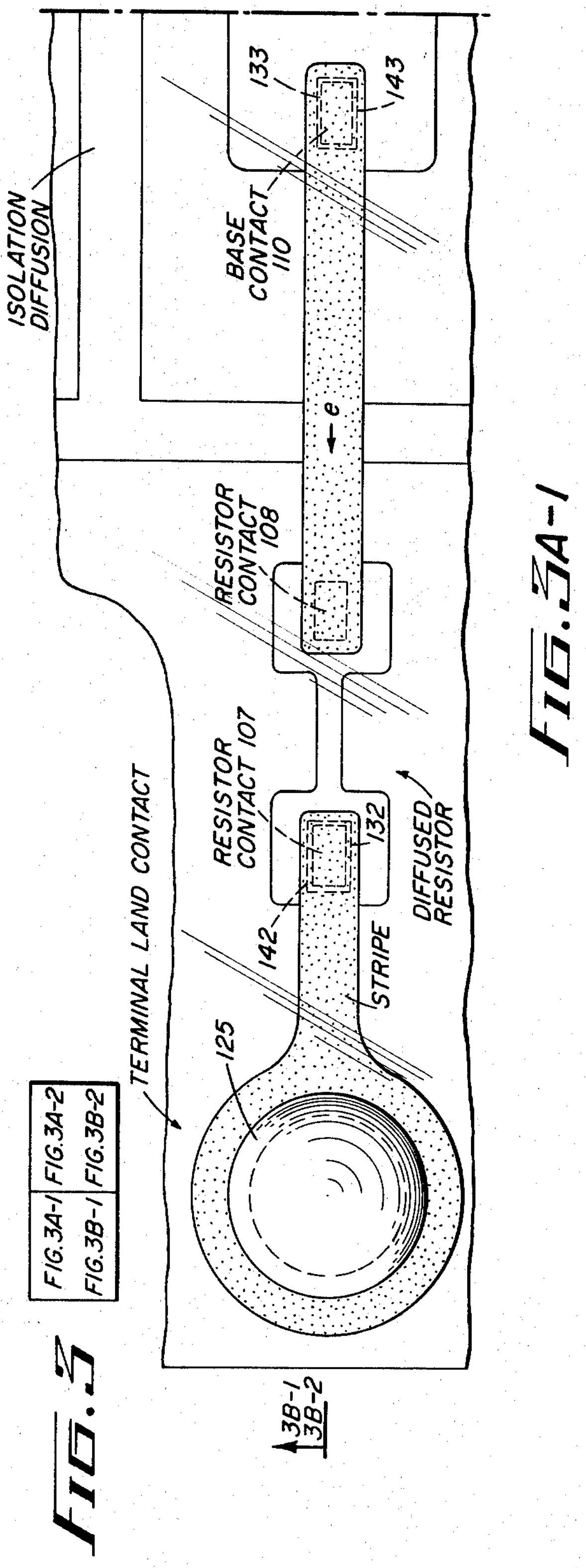
FIG. 3 is a diagram illustrating the relationship between FIGS. 3A–1, 3A–2, 3B–1 and 3B–2 which depict a portion of a microelectronic configuration.
FIGS. 3A–1 and 3A–2 are the top views and FIGS. 3B–1 and 3B–2 are the sectional elevation views of FIGS. 3A–1 and 3A–2, respectively, depicting a portion of a microelectronic configuration including regions of copper rejuvenant dominating regions wherein mass flux divergences occur under current stress according to this invention.
Figures 1, 3B:
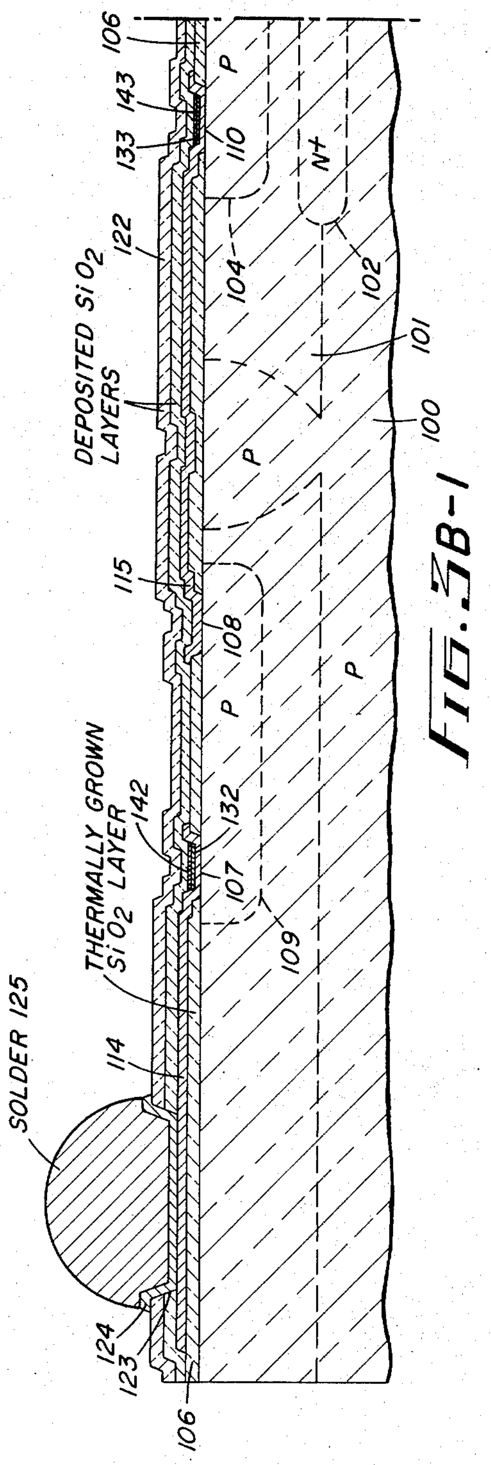
Figures 2, 3A:
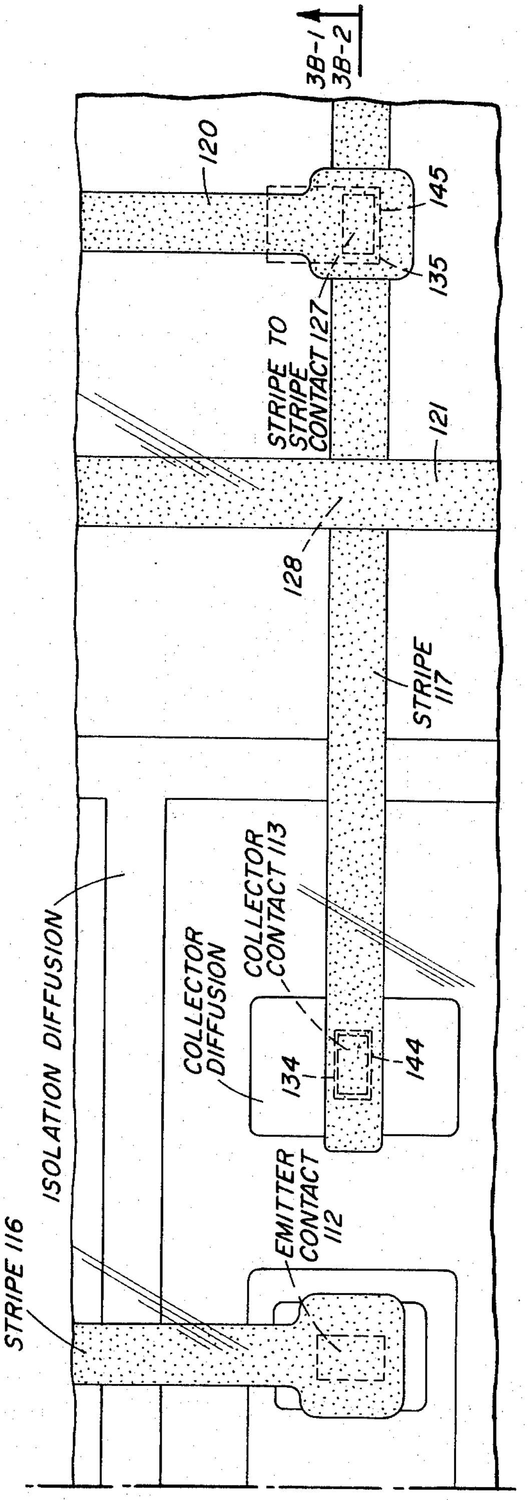
Figures 2, 3B:
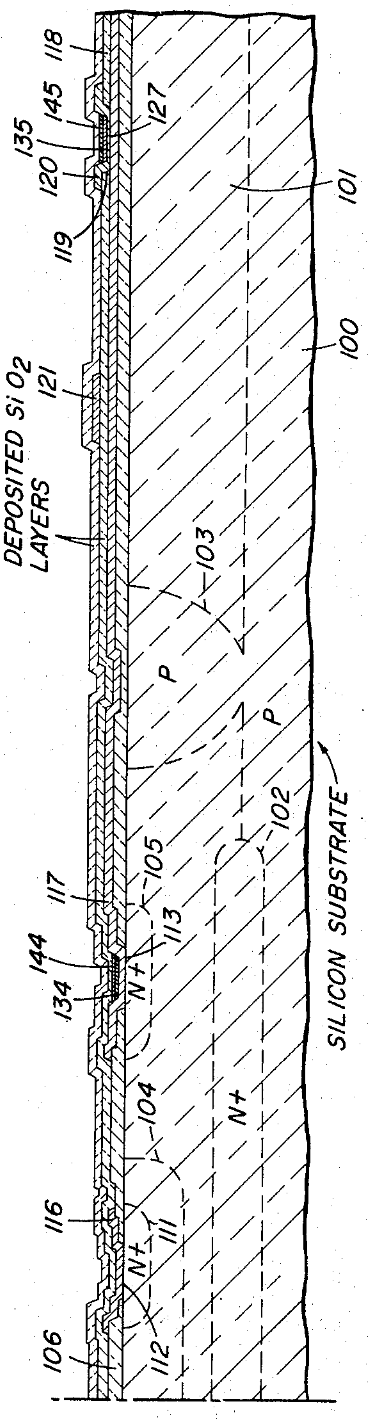

To illustrate the occurrence of failure due to current induced mass transport phenomena in conductive stripes typical of the prior art, reference is made to the drawing wherein FIGS. 1 and 2 provide scanning electron microscope images of an aluminum stripe (FIG. 1) and an aluminum strip containing about 3% copper dopant (FIG. 2) before and after subjecting said stripes to the flow of sufficient current to induce failure due to "stripe-cracking."

In FIG. 1, a group of similar aluminum thin film stripes were prepared from the same parent aluminum thin film. The stripes were prepared from aluminum films deposited by means of vacuum evaporation from a radio-frequency heated BN-$TiB_2$ evaporation source of the type described by I. Ames et al. in Rev. Sci. Instr., vol. 37, page 1837 (1966). The films were deposited on an oxide coated, silicon semiconductor chip maintained at a temperature of 200° C. during film deposition. Conventional stripe configurations were then produced from the films by photoprocessing. The films were then heat-treated at 530° C. in nitrogen for 20 minutes. The stripes so produced were immersed in an oil bath and connected to resistors of 22 ohm values; the stripe-resistor combinations were connected in parallel to a constant voltage power supply. The bath temperature was selected to give the desired stripe temperature, corrected for self-heating. The measured temperatures were accurate to within $\pm 5°$ C. during a typical run.

Figure 1A:
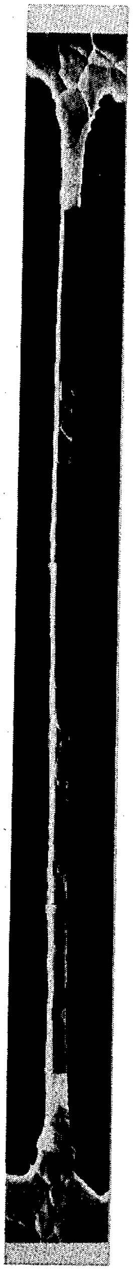
FIGS. 1A and 1B are photographs which show an aluminum stripe before (FIG. 1A) and after (FIG. 1B) having been subjected to the flow of sufficient current to induce "stripe-cracking."
Figure 1B:
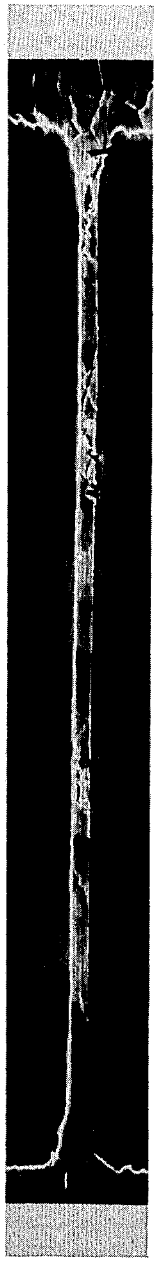

In order to present a more detailed characterization of the nature of the "crack," a 0.3 mil wide aluminum stripe having an unusually large grain size, approximately in the range of the stripe width was selected. FIGS. 1A and 1B show scanning electron microscope images of such a stripe before (FIG. 1A) and after (FIG. 1B) subjecting it to the flow of sufficient current to induce "stripe-cracking." FIG. 1B depicts the stripe after it was subjected for 223 hours to a current density of $2\times10^6$ amps/cm.$^2$ at a temperature of 170° C. FIG. 1B suggests that failure occurred as a result of material removal in the vicinity of grain boundaries and in a manner which appears to have favored the preferential removal of material along crystallographic directions. Localized pile-ups are usually found somewhere in the vicinity of the depletions downstream of the electron flow.

Figure 2A:
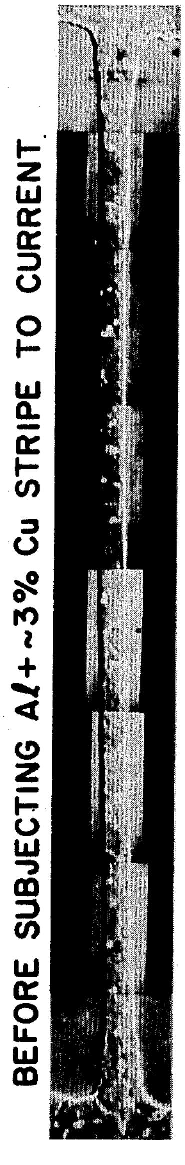
FIGS. 2A and 2B are photographs which show an aluminum stripe doped with about 3% copper by weight before (FIG. 2A) and after (FIG. 2B) having been subjected to the flow of sufficient current to induce "stripe-cracking."
Figure 2B:
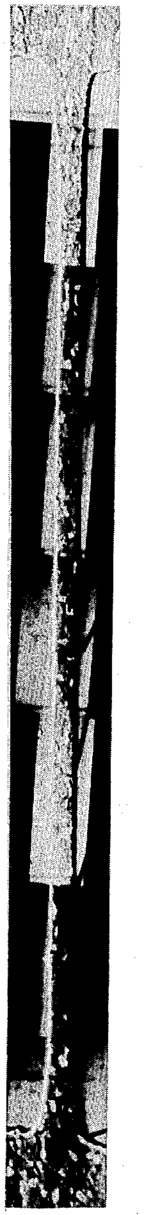

FIGS. 2A and 2B, like FIGS. 1A and 1B, show scanning electron microscope images of large grain type copper doped aluminum stripes having a grain size approximately in the range of the stripe width which were obtained before (FIG. 2A) and after (FIG. 2B) failure of such a stripe (copper content of approximately 3% by weight). The copper was introduced by separately depositing a copper layer above the aluminum film and causing the copper film to diffuse into the aluminum through the use of the combined effects of exposure to an elevated substrate temperature of 500° C. during film deposition and a subsequent heat treatment of 560° C. for 20 minutes in nitrogen. The stripe failed after 1242 hours at a current density of $4\times10^6$ amps/cm.$^2$ and a stripe temperature of 175° C. This is in sharp contrast to the undoped aluminum stripe of FIGS. 1A and 1B which was prepared in a comparable manner, which failed in 223 hours at a current density of $2\times10^6$ amps/cm.$^2$ and a stripe temperature of 170° C.

FIG. 3 is an illustrative diagram of the relationship between FIGS. 3A–1, 3A–2, 3B–1 and 3B–2.

FIGS. 3A–1 and 3A–2 are top views and FIGS. 3B–1 and 3B–2 are sectional views thereof. The integrated semiconductor structure depicted in these figures contains two levels of interconnecting metallization and solder-like terminals. It is formed by starting with a silicon substrate and performing epitaxial deposition, diffusion and oxidation steps on the substrate in accordance with state-of-the-art procedures. The particular type of circuit shown contains a p-type substrate 100 onto which has been deposited an n-type epitaxial layer 101 and into which has been diffused (by outdiffusion from the p-type substrate 100) a "buried" $n^+$-type layer 102, (prior to epitaxy) a p-type isolation diffusion 103, a p-type base diffusion 104 or resistor diffusion 109, and an $n^+$-(emitter) diffusion 111 or collector contact diffusion 105. Oxide growth and re-growth together with photoprocessing steps result in formation of a contoured, thermally-grown $SiO_2$ layer 106. Insulating layer 106 can also be formed in whole or in part with silicon nitride, alumina, etc. Prior to deposition of the first layer of metallization, contact holes are opened in that layer as indicated by the location of the metallization in contact with surface portions of the integrated semiconductor structure. Contact holes 107 and 108 are for access to a diffused p-type resistor 109. Contact hole 110 is for access to the p-type base 104 of the bipolar transistor consisting of base 104, emitter 111 and collectors 101, 102 and 105. Contact hole 112 is for access to the $n^+$-type emitter 111. Contact hole 113 is for access to the upper $n^+$-type collector contact portion 105 of the collector. Overlying the thermally-grown $SiO_2$ layer 106 and the indicated contacts is the first metallization layer in segments 114, 115, 116 and 117, each formed from the same parent metallization layer through the use of photo-processing techniques.

Above the first metallization layer is the first deposited insulating layer 118 which is preferably of silicon dioxide but can also be formed in whole or in part of silicon nitride, alumina, etc., deposited, for example, through the use of radio-frequency sputtering techniques. The layer contains via hole 119 for permitting access between the first metallization layer and an overlying metallization layer, which contains segments 120 and 121, which are formed by use of photoprocessing techniques. The segment 121 crosses over the segment 117 and is electrically insulated from it by means of the insulating layer 118. The segment 120 makes electrical contact to the segment 117 through the via hole 119. The overlying $SiO_2$ layer 122 serves primarily as a protective coating (for the underlying layers and semiconductor substrate) against atmospheric chemical attack or corrosion. A contact hole 123 is formed in that layer by photoprocessing through it and insulating layer 118. The overlying positive terminal land consists of a composite thin film metal layer 124 followed by a ball of solder 125.

Failure of the thin film metallization due to current-induced mass transport can occur in a number of different regions within the indicated microelectronic configuration. For example, failures attributable to the generation of diffusion barriers under current stress can arise at the positive metal-to-silicon contacts which occur at resistor contact 107 and the base and collector contacts, 110 and 113 respectively, of the npn transistor. Silicon, being essentially devoid of copper, is incapable of replenishing the copper loss due to current-induced mass transport in the conductive stripe. Additionally, failure can occur in the region of stripe to stripe contact 127 and also in the region of stripe 120 wherein the contact land area 130 of the stripe necks in to form the reduced portion 120 of the stripe. In these regions, the cross section of the conductor changes giving rise to current density gradients and resultant thermal gradients. In a region wherein an increasing thermal gradient exists or arises in the direction of electron flow, the rate at which copper atoms electromigrate out of such region will exceed the rate at which they migrate into said region resulting in a region of mass flux divergence and a net loss of copper. Conversely, in a region wherein a decreasing thermal gradient exists, copper atoms will build up presenting a significant barrier to further electromigration since the rate at which copper atoms enter such region will exceed that at which they leave such region. Thus, failures attributable to open circuits and/or short circuits can arise.

Frequently, as shown in FIG. 4, failure can occur in the region of a negative terminal land as a result of mass flux divergence due to a diffusion barrier at interface 126. A diffusion barrier arises in this region under current stress because the flow of electrons entering the conductive stripe 114 from the negative terminal land is capable of causing current-induced mass transport in the stripe; however, the region upstream of the electron flow, i.e., the terminal land comprising the thin film metal layer 124 and the solder ball 125, is essentially devoid of copper and therefore incapable of replenishing the copper loss in the region of interface 126.

In accordance with the present invention, microelectronic configurations as exemplified above can be conveniently modified to exhibit materially increased resistance against current-induced mass transport, said increased resistance being sustainable over long periods by appropriate treatment as herein described.

The regions described hereinabove with reference to the specific microelectronic configurations illustrated in FIGS. 3 and 4 wherein mass flux divergences occur under current stress, can be adapted to be rejuvenated in accordance with the present invention by depositing regions of copper rejuvenant over the regions wherein mass transport of copper will occur in service. For example, after formation of contact holes 107, 110 and 113 and deposition of the first layer of metallization, a copper source can be evaporated over the layer of metallization and, with proper masking, form regions of copper rejuvenant 132, 133 and 134, overlying the regions of contact holes 107, 110 and 113. Subsequently, insulating layer 118 is deposited over the metallization and regions of copper rejuvenant. If desired, thin layers of chromium 142, 143 and 144 can be deposited over the regions of copper rejuvenant to enhance the adhesion of such regions to the overlying insulating layer 118. In similar fashion, once via hole 119 is opened and the overlying metallization layer is deposited making electrical contact between segment 120 and segment 117, a copper source can be deposited over the region of stripe to stripe contact 127 and the region of neck down between land area 130 and stripe 120 forming an overlying region of copper rejuvenant 135. If desired, a layer of chromium 145 can be deposited to aid in adhesion with the overlying insulating layer 118.

Figure 4A:
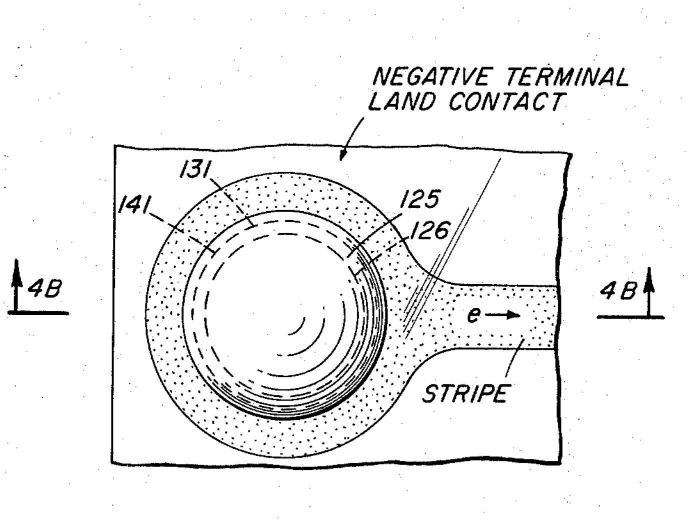
FIG. 4A is a top view and FIG. 4B is the sectional elevation view, respectively, depicting that portion of a microelectronic configuration illustrating the application of the present invention to a negative terminal land contact.
Figure 4B:
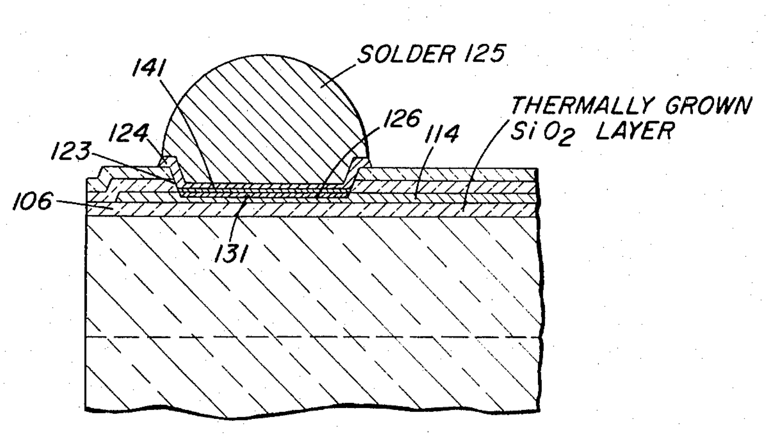

Similarly, as shown in FIGS. 4A and 4B, once contact hole 123 is formed by photoprocessing through insulating layers 122 and 118 thereby exposing the region of interface 126, a copper source can be evaporated over the surface of interface 126 forming a discrete region of copper rejuvenant 131. If desired, a thin layer of chromium 141 can be deposited over the copper to enhance the adhesion of said region to adjacent regions. Thereafter, the overlying terminal land comprising thin film metal layer 124 and the ball of solder 125 can be formed. In operation, the electron flow through the terminal land can carry copper rejuvenant with the conductive stripe 114 thereby replenishing copper lost by mass transport.

PRACTICE OF THE INVENTION

The apparatus required for fabricating microelectronic configurations in accordance with the practice of this invention generally comprises a film deposition chamber, a photoprocessing facility and a heat-treatment furnace. Illustratively, the copper-doped aluminum stripes or films for the metallization layers are deposited directly onto an appropriate substrate. If vacuum evaporation is used, the film is deposited directly by evaporation (possibly to completion) from a melt which contains the parent Al material plus the desired Cu material addition, or by coevaporation, e.g., via use of several sources, of the former and the latter, or by a sequential deposition whereby the Al material is deposited first and then the Cu material addition or additions are deposited subsequently in a prescribed manner. Additionally copper may be added through use of an electron-bombardment evaporation source which has a water-cooled copper hearth; the operational parameters of the source are maintained at a level sufficient to cause some evaporation of copper during the evaporation of the Al parent material.

One useful procedure is the "sandwich" structure; the Cu material addition is deposited as one or more alternating layers betwen two or more layers of the Al. Thereafter, the Cu of the sandwich is diffused appropriately into the Al by heat-treatment.

The radio-frequency sputtering procedure described by P. Davidse et al., J. Appl. Phys., vol. 37, page 574 (1966) is appropriate for deposition of the composite material whereby Al plus Cu are incorporated in the cathode.

The addition of approximately 3% of Si to Al films in order to retard alloying at the Al-to-Si contact in planar Si devices in which Al is utilized for circuit interconnections may, if desired, be added via the same procedures described above.

Film deposition, e.g., at a substrate temperature of 200° C. during deposition, is carried out first and is followed by a heat-treatment for approximately several minutes to one hour in an inert atmosphere, e.g., $N_2$, at an optimum temperature, e.g., between approximately 250° C. and 560° C. if planar silicon semiconductor devices or integrated circuits are to be metallized for electrical interconnection purposes.

If satisfactory adhesion to an oxidized silicon substrate is desired, as in the case of metallization of planar silicon semiconductor devices or integrated circuits, some Al should be present in the initial portion of the deposition. Adhesion will be assured if the composition of the incident evaporant is mostly aluminum and the silicon substrate is maintained at a temperature of approximately 200° C. during film deposition.

Suitable photoprocessing procedures for the practice of this invention are described in the textbook "Integrated Circuits, Design Principles and Fabrication," by R. W. Warner, Jr. et al., McGraw-Hill Book Co., 1965.

Once the metallization layers have been deposited, the regions within the microelectronic configuration wherein mass flux divergences are apt to occur under current stress can be isolated and exposed by suitable photoprocessing procedures. Thereafter, a layer of copper rejuvenant can be deposited over said exposed regions by any of the deposition techniques described herein. The thickness of the copper layer is not considered critical and can vary widely between about 50 A. and about 5,000 A. It is considered preferable to apply the copper rejuvenant layer at as late a point in the construction of the microelectronic configuration as possible to avoid premature diffusion of the copper into the metallization layer during any subsequent deposition, diffusion and oxidation steps involved in the construction of the microelectron configuration.

To obtain improved adhesion of the copper rejuvenant regions to the overlying insulating regions which are generally formed of silicon dioxide, silicon nitride, alumina and the like, it is considered prferable to deposit a layer of chromium over the copper rejuvenant regions prior to application of said overlying insulating layer. The thickness of the chromium layer is not critical and can vary widely between about 50 A. and about 2,000 A.

In service, the discrete regions of copper rejuvenant dominating regions of potential mass flux divergences provide a ready reservoir of copper to replenish the copper lost by electromigration. The copper rejuvenant can be carried into the depleted copper regions by appropriate electron flow or diffusion. Preferably, the entire microelectronic configuration is periodically subjected to a heat treatment in the range of from about 50° C. to about 550° C. to effect rapid and beneficial replenishment of depleted copper. The heat treatment can be conducted at suitable intervals depending upon the normal projected lifetime of the particular device. If desired, the heat treatment can be conducted at regular intervals such as, for example, every six months or annually. The heat treatment is conducted for a period of time sufficient to permit the copper rejuvenant to diffuse into those regions wherein mass flux divergences have occurred in service thereby enhancing and restoring the resistance of the conductive stripe to current-induced mass transport. Since the localized copper reservoirs shorten diffusion distances and hence, diffusion times, the heat treatment need generally be conducted for only a relatively short period of time, for example from about 5 minutes to about a week or more depending upon the particular temperature employed.

EXAMPLE OF THE INVENTION

Figure 5:
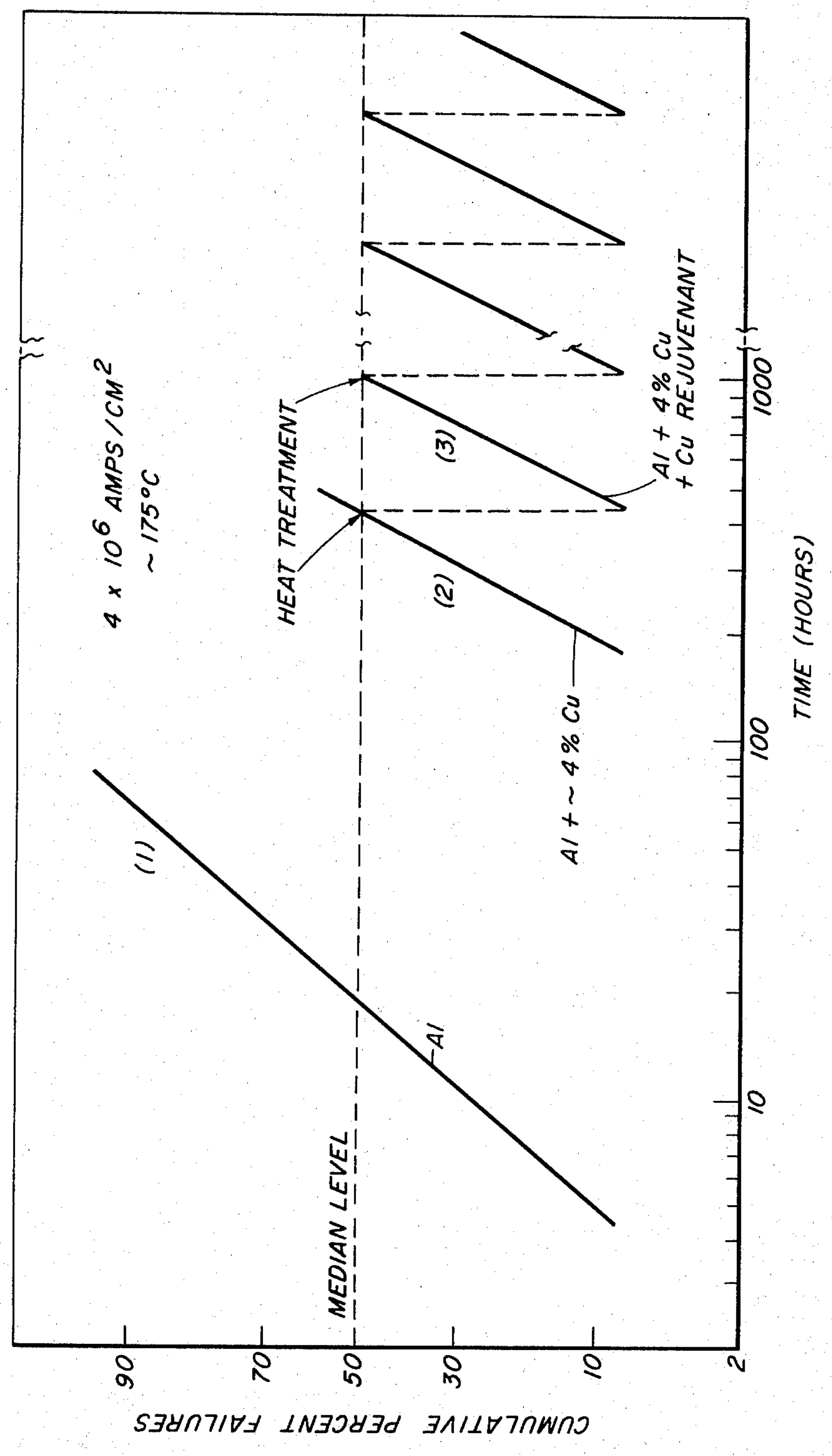
FIG. 5 shows cumulative percentage failure versus time in a logarithmic scale for (1) a group of similar thin film stripes prepared from the same aluminum thin film (left-hand side of figure), (2) comparable aluminum stripes which differ from the former only in so far as they contain 4% copper by weight (center of figure) and (3) the identical copper doped aluminum stripes as employed in (2) except containing regions of copper rejuvenant above regions wherein mass flux divergences arise under current stress, said stripes being periodically rejuvenated by heat treatment (right-hand side of figure).

The effectiveness of the present invention in prolonging the in-service lifetime of microelectronic configurations which employ aluminum-copper conductive stripes through the use of discrete regions of copper rejuvenant dominating regions wherein mass flux divergences occur under current stress is clearly demonstrated in FIG. 5.

For. 5 is a graph which illustrates the cumulative percentage failure data for "stripe-cracking" in a group (1) of similar Al thin film-stripes prepared from the same parent Al thin film. The stripes were prepared from Al films deposited by means of vacuum evaporation from a radio-frequency heated BN-$TiB_2$ evaporation source of the type described by I. Ames et al. in Rev. Sci. Instr. vol. 37, page 1737 (1966). The oxide coated, silicon substrates were maintained at a temperature of 200° C. during film deposition. Stripes were then produced from the films by photoprocessing. The films were then heat-treated at 530° C. in nitrogen for 20 minutes. An oxide coated silicon semiconductor chip of 75 mils by 75 mils supporting the stripe was bonded to a header by conductive epoxy. Electrical power was connected to each stripe by 0.7 mil diameter gold wires bonded to the aluminum areas or by 1 mil diameter aluminum wires bonded thereto.

The resistance of each stripe was obtained through current and voltage measurements. The average temperature rise of a stripe at high current levels was estimated by using it as its own resistance thermometer. Typically, the temperature rise obtained for a 0.3 mil x 10 mil x 5000 A. stripe on a 75 mil by 75 mil silicon chip having a 1000 A. thick oxide film was about 5° C. above ambient, e.g., 80° C., for a current density of $2\times10^6$ amps/cm.$^2$.

FIG. 5 also presents data for comparable copper doped aluminum stripes (2) which differ from the Al stripes (1) as they contain 4% copper by weight. The copper was introduced by depositing the film in the form of a "sandwich" whereby an aluminum layer was deposited first, followed by a thin copper layer, followed by an overlying aluminum layer. As in the case of the Al stripes used for the left-hand portion of the data of FIG. 5, a heat treatment at 530° C. for 20 minutes in nitrogen was used prior to subjecting the stripes to the flow of a current, at a current density of $4\times10^6$ amps/cm.$^2$ at a stripe temperature of 175° C. The median lifetime shows a marked increase from a value of approximately 20 hours in the case of the undoped stripe to approximately 400 hours in the case of the doped stripe, an increase by approximately a factor of 20 in the median lifetime.

In addition, FIG. 5 presents data (3) for copper doped aluminum stripes containing 4% copper by weight which are prepared in the identical manner as those in (2). In this instance, however, regions of copper rejuvenant are deposited over the regions wherein the large land areas of the dumbbell-shaped stripes neck-in giving rise to thermal gradients and consequent mass flux divergences under current stress. The stripes are subjected to periodic heat treatments at a temperature of about 200° C. for one hour.

For purposes of illustration, the stripes are heat treated upon reaching the median lifetime. It is understood, of course, that, in practice, heat treatment would be conducted at a much earlier point in time depending upon the projected lifetime of the device or at regular intervals based upon field return data. In this manner, the median lifetime is extended to well over 1000 hours. With periodic rejuventation obtained through heat treatment and replenishment of depleted copper by the copper rejuvenant in the above manner, the lifetime of the stripe can be even further extended until such time as the copper rejuvenant region is exhausted.

Although this invention has been described primarily through reference to rejuvenation of copper doped aluminum conductive stripes, the invention is equally applicable to rejuvenation of other dopants which exert a retarding effect on the electromigration of the base metal, yet are themselves subject to electromigration under current stress. Illustrative of such dopants are single constituent dopants such as copper, iron, magnesium, silver and the like, as well as multi-constituent dopants such as $CuAl_2$ and the like. Similarly, this invention is applicable to rejuvenation of doped conductive stripes wherein the base metal of the stripe is, for example, aluminum, silver, gold, platinum and the like. In such instances, the time-to-failure of the particular doped stripe can be prolonged by depositing discrete regions of dopant rejuvenant upon regions in the stripe wherein dopant depletion is most apt to occur under current stress as set forth herein.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An improved long-life stripe comprising a layer of electrical current-carrying conductive material provided with a dopant, said material being subject to depletion of said dopant from discrete regions under current stress,
   said regions being characterized by one of a current density gradient and a dopant concentration gradient,
   and discrete discontinuous regions of a dopant rejuvenant placed at said regions for replenishing the depleted dopant, said dopant rejuvenant consisting essentially of said dopant.

2. An improved long-life stripe as set forth in claim 1 wherein said dopant is copper.

3. An improved long life stripe as set forth in claim 2 wherein the conductive material is aluminum.

4. An improved long life stripe as set forth in claim 3 wherein said copper dopant is present in effective amounts less than about 54% by weight.

5. An improved long life stripe as set forth in claim 4 wherein said copper dopant is present in amounts ranging from about 0.1 to about 10% by weight.

6. A microelectronic configuration having at least one improved long-life stripe for supplying current to said configuration,
   said stripe comprising a layer of electrical current-carrying conductive material provided with an amount of dopant sufficient to retard current-induced mass transport of said conductive material,
   said material being subject to depletion of said dopant from discrete regions under current stress,
   said discrete regions being characterized by one of a current density gradient and a dopant concentration gradient,
   said stripe containing thereon discrete, discontinuous regions of a dopant rejuvenant placed at said discrete regions within the stripe wherein mass flux divergence causes depletion of dopant under current stress, said dopant rejuvenant being adapted to replenish the depleted dopant, said dopant rejuvenant consisting essentially of said dopant.

7. A microelectronic concentration as set forth in claim 6 wherein said dopant is copper.

8. A microelectronic configuration as set forth in claim 7 wherein the conductive material of the stripe is aluminum.

9. A microelectronic configuration as set forth in claim 8 wherein said copper dopant is present in amounts ranging from about 0.1 to about 10% by weight.

10. A microelectronic configuration as set forth in claim 8 wherein a layer of chromium covers said discrete regions of copper rejuvenant.

References Cited

UNITED STATES PATENTS

| | | | |
|---|---|---|---|
| 1,671,952 | 5/1928 | Brink | 75—144 |
| 2,100,411 | 11/1937 | Reuleaux | 148—127 X |
| 2,437,620 | 3/1948 | Speer | 204—23 |
| 2,472,304 | 6/1949 | Mason | 204—17 |
| 2,506,164 | 5/1950 | Morse | 204—17 |
| 2,588,019 | 3/1952 | Law | 204—156 X |
| 2,984,775 | 5/1961 | Matlow et al. | 136—89 UX |
| 3,108,006 | 10/1963 | Kenedi | 204—33 X |
| 3,474,530 | 10/1969 | Ainslie et al. | 29—593 X |
| 3,281,340 | 10/1966 | London | 204—33 X |
| 3,382,568 | 5/1968 | Kuiper | 117—107 X |

OTHER REFERENCES

Levinson et al.: "Electroplating on Aluminum Alloys in Plating," vol. 53, No. 8, August 1966, pp. 986–990.

ALLEN B. CURTIS, Primary Examiner

U.S. Cl. X.R.

29—593; 148—127; 204—17